Aug. 4, 1942.   F. K. FLOYD   2,292,113
MAGNETIC GAUGE
Filed Oct. 11, 1941

Inventor:
Frederick K. Floyd,
by Harry E. Dunham
His Attorney.

Patented Aug. 4, 1942

2,292,113

UNITED STATES PATENT OFFICE 2,292,113

MAGNETIC GAUGE

Frederick K. Floyd, Denver, Colo., assignor to General Electric Company, a corporation of New York Application October 11, 1941, Serial No. 414,663

5 Claims. (Cl. 33—147)

My invention relates to gauging devices and in particular to a gauging device in which changes in dimensions of the parts being examined are made manifest by a magnetic measuring and indicating instrument. In carrying my invention into effect in its preferred form I provide a flux responsive instrument with a field structure in which there are a plurality of parallel flux paths, which field structure is energized by a permanent magnet which is movable to change the flux distribution between the different paths in accordance with changes in the dimension to be gauged. The flux through the path containing the flux responsive element may be varied and reversed in direction to indicate the magnitude and direction of dimensional changes from a standard value. At the same time considerable amplifying effect may be obtained.

The features of my invention which are believed to be novel and patentable will be pointed out in the claims appended hereto. For a better understanding of my invention reference is made in the following description to the accompanying drawing, showing in Fig. 1 a form of my invention where the instrument is provided with a centering spring, and in Figs. 2 and 3 different measurement positions of a modification where no return spring is required of the instrument.

Figure 1:
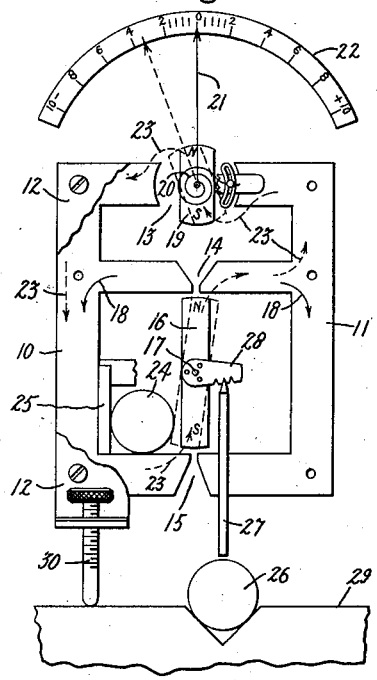

Referring now to Fig. 1, 10 and 11 represent symmetrical halves of a magnetic circuit structure which will be rigidly secured in the relation shown by a suitable framework structure such as non-magnetic side plates, one of which is indicated at 12. The two E-shaped magnetic circuit parts 10 and 11 have their three polar arms extending towards each other to form upper, lower and central air gaps at 13, 14, and 15. Between the gaps 14 and 15 is a permanent magnet armature 16 pivoted at 17. When this permanent magnet is in a symmetrical position as shown in full lines, its opposite polarity ends are closely adjacent to and symmetrical with respect to the pole pieces forming the gaps at 14 and 15. In such position the flux of the permanent magnet 16 divides equally, half finding a return path through the lower part of section 10 and the other half finding a return path through the lower part of section 11 as indicated by arrows 18. Under this condition members 10 and 11 are equally polarized and there is no mmf. across armature gap 23. Between the upper legs of the structure in the gap at 13 is a pivoted armature 19. This armature may be any type responsive to the direction and magnitude of flux which passes between the pole pieces forming the gap 13 in which the armature is located. In the illustration I have shown an unwound armature comprising a bar-shaped member of magnetic material which is preferably a relatively weak permanent magnet polarized as indicated by the designations N and S. This armature is biased by one or more springs 20 to a neutral position in the gap 13. The armature carries a pointer 21 indicating on a graduated scale 22 and in the neutral position of the armature shown the pointer indicates on the zero center of the scale.

If, now, the permanent magnet 16 be turned on its pivot from a symmetrical position to some such position as is indicated by the dotted lines, the magnetic symmetry is disturbed and a portion of the flux of magnet 16 will take the path indicated by arrows 23 and in so doing will influence the armature 19 to turn it counter clockwise against the tension of its return spring 20, as indicated by the dotted line position of the armature and its pointer. Further displacement of magnet 16 in the same direction will increase the counter clockwise rotation of armature 19 as the magnetic unbalance condition or reverse polarization of the members 10 and 11 is increased.

However, if the permanent magnet 16 be turned counter-clockwise from a central position, the magnetic unbalance or polarization of members 10 and 11 would be reversed and armature 19 would be turned clockwise from the central position. By properly proportioning the gap relations the deflection of the permanent magnet 16 from a central position may be substantially uniformly amplified and indicated on the scale 22 in suitable units.

The movement or displacement of the permanent magnet 16 may be used for gauging dimensions in a variety of ways. For example, at 24 I have represented a circular bar which may be positioned between the yoke part 10 and the lower end of magnet 16 with or without a spacing piece 25 of known dimensions and the magnet 16 pressed against the piece 24 and its diameter or its departure from a given diameter noted on scale 22. If the piece to be gauged be of magnetic material, it should be removed from magnetic structure where its presence will not influence the flux distribution as at 26 and a non-magnetic spacer rod such as 27 used between the armature and test piece 26. I have shown a notched lever part 28 secured to the permanent magnet 16 adjacent its pivoted axis 17 to facilitate gauging dimensions with the spacer rod 27. 29 represents a base member for holding the test piece 26. The gauge may be exactly positioned with respect to the base member 29 by leveling screws one of which is shown at 30.

This arrangement may be used as follows: With a piece 26 of correct dimensions used as a standard in position the gauge is adjusted until the pointer 21 reads zero when the rod 27 is in contact with both the standard test piece and the selected notch in lever arm 28.

Now, the standard 26 is removed and other parts to be tested are inserted in its place and the gauging operations repeated. Pieces which are under diameter will give a minus reading on the left of scale 22 and pieces which are over diameter will give a plus reading on the right of scale 22. The exact amount of such variations from the standard dimension may be obtained from a calibration of the gauge. The amplification of the dimensional change may be increased by decreasing the length of lever arm 28 as by using a notch nearer the pivot 17. Also, the length of the permanent magnet 16 and the corresponding lower section of the magnetic circuit may be increased to increase the amplification.

Figure 2:
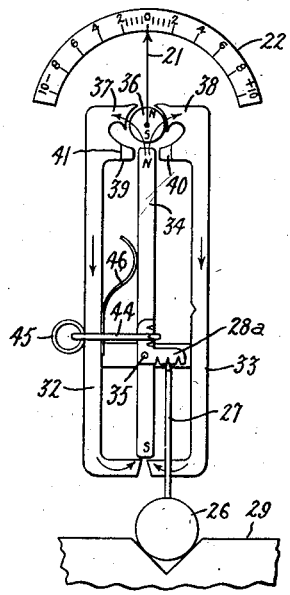
Figure 3:
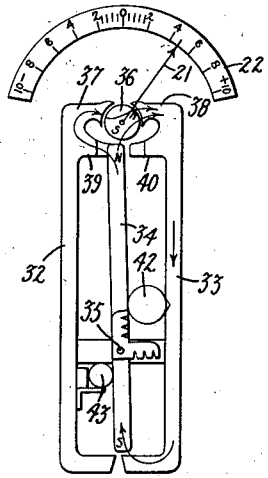

In Figs. 2 and 3 I have shown a form of my invention in which no return spring is needed for bringing the instrument armature to a zero or neutral position since in this modification the restoring torque is supplied magnetically. Fig. 2 shows the parts of the gauge in a neutral position and Fig. 3 shows the parts in non-neutral deflecting position. In Figs. 2 and 3, 32 and 33 represent symmetrical field circuit sections of magnetic material and 34 a central permanent magnet pivoted at 35. The arrangement at the lower gap is substantially similar to that of Fig. 1. The instrument armature 36 may comprise a cylindrical piece of sintered oxide polarized across a diameter and pivoted on its cylindrical axis. Such armature may be made as explained in U. S. Patent No. 2,101,665, December 7, 1937. The armature is located in a gap formed primarily by pole pieces at 37 and 38 at the upper extremities of magnetic parts 32 and 33 and the upper end of the permanent magnet 34. The upper end of the permanent magnet is located in a gap between pole pieces 39 and 40 extending from the members 32 and 33. The pole pieces 39 and 40 are preferably slotted so that the upper end of magnet 34 may enter the recess therein without touching, at least until it reaches the bottom of the slots. In the drawing the front slot section has been omitted and the line 41 represents the bottom of a slot. The pole pieces 39 and 40 act primarily to distribute flux from the upper end of the permanent magnet to the pole pieces 37 and 38 when the magnet 34 is moved from a central neutral position. They may directly influence the armature 36 to a limited extent. The air gaps between the armature 36 and pole pieces 37 and 38 are less than that between the armature and pole pieces 39 and 40.

It is evident that when permanent magnet 34 is in the central position shown in Fig. 2 its magnetism directly influences the armature 36 due to the attraction of unlike poles in both. The flux from both magnets in series flows equally into the pole pieces 37 and 38 and returns through the parts 32 and 33 to the lower pole of magnet 34. At this time pole pieces 39 and 40 have little influence although they may equally pass excess flux from the permanent magnet 34. When the magnet 34 is moved from a central position as indicated in Fig. 3 the symmetrical flux distribution is disturbed and a considerable portion of the flux from the upper end of magnet 34 passes into pole piece 39 to pole piece 37 and enters the armature and passes from the armature to pole piece 38. This turns the armature clockwise as shown by an amount proportional to the off-center position of the permanent magnet 34. Further displacement will cause practically all of the flux of magnet 34 to enter the armature by way of pole pieces 39 and 37, turning the armature nearly 90 degrees from the position shown in Fig. 2. Movement of the upper pole piece of magnet 34 to the right of a central position will produce counter-clockwise rotation of the armature from a central position.

Movement of magnet 34 may be caused by various gauging operations. For example, nonmagnetic pieces to be gauged may be inserted at 42 or 43, Fig. 3, and pieces either magnetic or otherwise may be positioned between a support and a spacer rod 27 as at 26 in Fig. 2, or a spacer rod 44 in the form of a hook may be used to gauge the wall thickness of a pipe 45. Springs such as shown at 46 may be used to hold the parts tight against the test piece being gauged.

The amplification, both as regards the rotation of the armature and as regards the lever arm of the upper end of magnet 34, is somewhat greater in Fig. 2 than in Fig. 1.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A magnetic gauging instrument comprising a pair of three-legged magnetic members with their legs symmetrically extending towards each other to form three magnetic gaps, a permanent magnet having one of its poles positioned adjacent one of the gaps and its other pole positioned adjacent another gap and pivoted to turn to vary the distribution of its flux between the pole pieces forming such gaps and thereby the direction and magnitude of its flux which passes across the third gap, and an armature pivotally mounted within the third gap and influenced by the direction and magnitude of the flux therein to produce an amplified indication of the extent and direction of the movement of the permanent magnet from a given position.

2. A magnetic gauging device comprising a pair of magnetic members each having three projecting pole pieces, said members being symmetrically positioned with their pole pieces facing each other to form three magnetic gaps, a permanent magnet mounted between two of the gaps and pivoted so as to be rotated in opposite directions from a position where its flux is symmetrically distributed in the magnetic members forming a return path, an armature pivoted in the third gap and influenced by the flux therein, the direction and magnitude of the flux across the third gap varying as the permanent magnet is turned in opposite directions from a symmetrical magnetic distribution position.

3. A magnetic gauging device comprising a pair of magnetic members magnetically separated by three air gaps, an armature member pivoted in one of the air gaps and influenced by the direction and magnitude of any flux therein, and a permanent magnet extending between the other two air gaps and pivoted therebetween so as to be moved to vary the relative magnitude of its flux which enters the different members at such two air gaps, such variation varying the flux through the armature air gap.

4. A magnetic gauging device comprising a pair of magnetic members separated by three magnetic air gaps in parallel relation, a polarized magnetic armature pivoted in one of the gaps influenced by the direction and magnitude of any flux therein, a permanent magnet having a north pole adjacent one of the other gaps and a south pole adjacent the remaining gap, said permanent magnet being pivoted between its poles so that it may be turned through a small angle to reverse the polarity of and vary the magnitude of the flux which it induces in said pair of magnetic members, thereby varying the direction and magnitude of the flux in the armature air gap, the angular deflection of the armature being large as compared to the angular movement of the permanent magnet.

5. A magnetic gauging device comprising a pair of magnetic members separated by three magnetic air gaps, a polarized armature pivotally mounted in one of said gaps and influenced by the direction of any flux therein, a permanent magnet extending between the other two gaps and pivoted between its two ends so as to be turned to vary the direction and magnitude of distribution of its flux between the two members, one pole of said permanent magnet approaching sufficiently close to the polarized armature as to determine the rotary position of said armature when the permanent magnet is in a symmetrical magnetic polarizing position with respect to said two members.

FREDERICK K. FLOYD.

DISCLAIMER 2,292,113.—*Frederick K. Floyd*, Denver, Colo. MAGNETIC GAUGE. Patent dated August 4, 1942. Disclaimer filed October 2, 1943, by the assignee, *General Electric Company*.

Hereby enters this disclaimer to claim 3 in said specification.

[*Official Gazette November 2, 1943.*]